C. DEAR.
MANUFACTURE OF STEEL.
APPLICATION FILED DEC. 30, 1916
1,304,947.
Patented May 27, 1919.
2 SHEETS—SHEET 1.
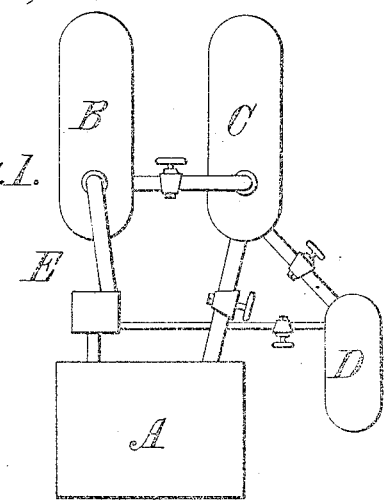
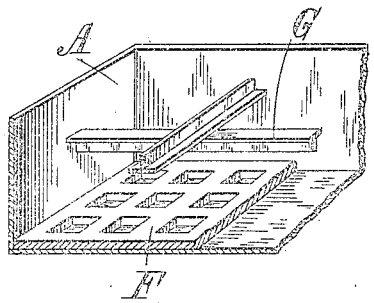
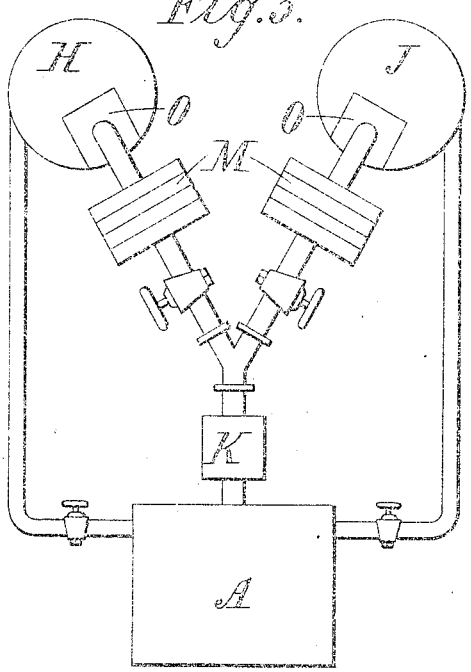
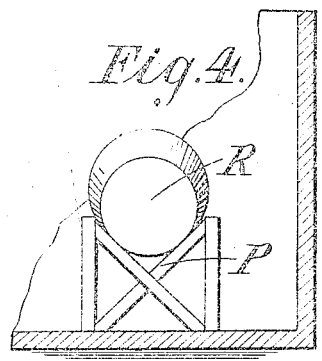
Witnesses
Inventor
Charles Dear, C. DEAR.
MANUFACTURE OF STEEL.
APPLICATION FILED DEC. 30, 1916.
1,304,947.
Patented May 27, 1919.
2 SHEETS—SHEET 2.
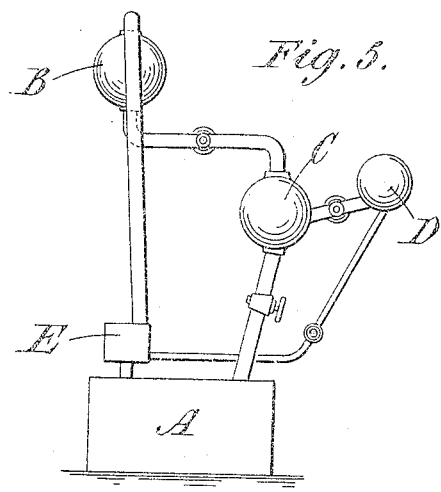
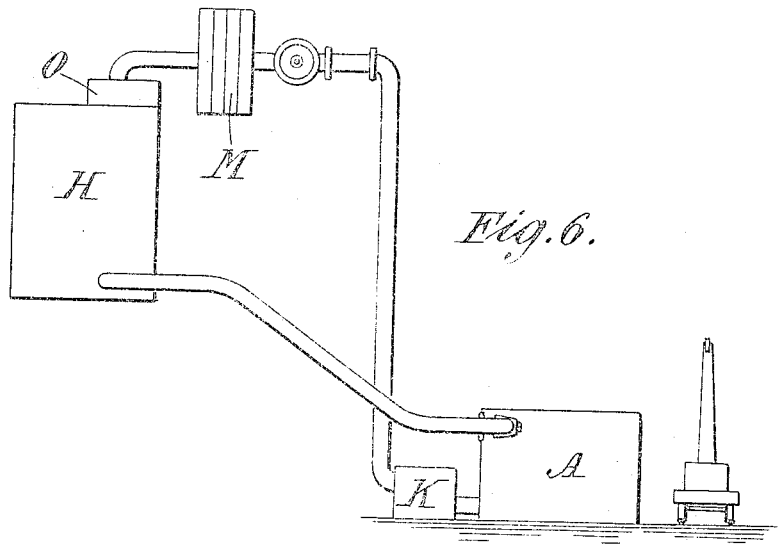
Witnesses
R. A. Balderson
G. B. Bleming
Inventor
Charles Dear
by Bakewell, Byrnes, Parmelee
Attys

UNITED STATES PATENT OFFICE.

CHARLES DEAR, OF LONDON, ENGLAND, ASSIGNOR TO THE MIRIS STEEL COMPANY LIMITED, OF LONDON, ENGLAND.

MANUFACTURE OF STEEL.

1,304,947.  Specification of Letters Patent.  Patented May 27, 1919.

Application filed December 30, 1916. Serial No. 139,909.

*To all whom it may concern:*

Be it known that I, CHARLES DEAR, a subject of the King of England, residing in London, England, have invented certain new and useful Improvements in the Manufacture of Steel, of which the following is a specification.

This invention relates to the manufacture of steel and has for its object the provision of apparatus suitable for expeditiously and uniformly handling ingots that are to be plunged into a bath of water or liquid solution while still hot, that is to say before they have cooled from the heat of casting.

According to the present invention, for the treatment of hot steel ingots by the aforesaid process there are provided in combination a tank to contain the liquid in which the ingots are to be immersed, two reservoirs each of which is of a capacity not less than that of the tank and both of which are connected with the tank, and means to transfer the liquid contents of the tank to and from either reservoir at will; preferably a cooling device is provided to cool the liquid either in its passage from tank to reservoir or vice-versa, or while it is in the reservoir.

The present invention further provides a tank to constitute the immersing tank coöperating with two reservoirs, each of which is of a capacity not less than that of the tank, so situated and connected that the liquid contents of one reservoir can gravitate into the second and the liquid contents of the second can gravitate into the tank, together with a pump for transferring the liquid contents of the tank into the first said reservoir. To this apparatus a third reservoir may be added of less capacity than either of the other two, to contain fresh liquor or water to make good the loss by evaporation and wastage.

The tank is preferably constructed with a partition whereby ingots immersed upright in it are prevented from falling over, and preferably there extends over the bottom of the tank a grating through the interstices of which sludge can pass so that ingots stand on the grating clear of the sludge.

The tank may, however, be made of such dimensions as to receive an ingot with its length horizontal, or approximately so, and of such a depth that, in coöperation with means provided for the purpose, the ingot may be, by a continuous operation, lowered with its length horizontal or approximately so, down to the full predetermined depth of immersion and then raised clear of the liquid; the said depth and lowering means are so devised that when the ingot emerges from the liquid it has been sufficiently cooled not to recalesce.

Embodiments of this invention are illustrated in the accompanying drawings in which—

Figure 1 is a diagrammatic plan of one arrangement of apparatus;

Fig. 2 is a perspective view of a portion of one construction of tank to be employed with the apparatus of Fig. 1;

Fig. 3 is a diagrammatic view, similar to Fig. 1, of a modified arrangement;

Fig. 4 is a view in elevation of a detail to be employed with the apparatus of Fig. 3.

Fig. 5 is a diagrammatic side elevation of the arrangement of the apparatus shown in Fig. 1, and Fig. 6 is a similar view of the apparatus shown in Fig. 3.

The apparatus shown in Fig. 1 comprises an immersing tank A situated with its upper edge approximately at ground level and connected through a pump E with a reservoir B of, say, 10,000 gallons capacity situated sufficiently high above the ground level to accommodate at a level below it and above the ground level a second reservoir C of equal capacity. The pump E is provided to draw the liquid contents from the tank and deliver them into the reservoir B. Piping and valves are provided so that the liquor can then gravitate under control into the reservoir C, and again from this into the tank A, as and when desired. A third reservoir D of, say 5,000 gallons capacity is provided at about the level of the second reservoir C and connected to the pump E and the reservoir C by piping and valves. The object of the reservoir D is to serve as a reserve of liquor which may be drawn upon to make good evaporation and wastage of the main liquor.

The tank A is of, say, 10,000 gallons capacity and has its floor covered by a grating F, seen in Fig. 2, of from 6 to 12 inches thick on which the ingots are to be stood.

A frame-work G of T-iron bars is secured to the sides of the tank about half way from the top, the frame-work constituting an open lattice, each aperture through which can receive an ingot lowered vertically through it on to the grating so as to engage with it and be prevented by it from falling over.

With this arrangement the ingots are lowered into the liquor in the tank by means of dogs, and when they have been sufficiently treated the liquor is removed by the pump E and delivered into the reservoir B, with the advantage that the volume of steam in the neighborhood of the tank impeding the operation of removing the ingots is greatly reduced. The ingots are then removed by means of dogs instead of slings, which operation is greatly facilitated by the facts that they are fully exposed to view and that there is less steam present than if the liquor had been left standing in the tank.

As above stated the capacity of the reservoirs B and C is not less than the capacity of the tank A. After the ingots have been cooled in the tank A, the liquid is pumped to the tank B, in which it is partially cooled. When it is desired to immerse another batch of ingots the cooled liquid is run from the reservoir C to the tank A, and the partially cooled liquid is run from the reservoir B to the reservoir C, in which it is further cooled before it is delivered to the tank A.

In the arrangement shown in Fig. 3, an immersing tank A of, say, 5,000 gallons capacity is constructed and sunk in the ground with its upper edge at about ground level. Two reservoirs H and J each also of about 5,000 gallons capacity are provided and one reservoir and the tank are charged with the water or aqueous solution in which the ingot is to be immersed. The tank is connected with both reservoirs through convenient piping and valves and a pump K are provided to enable the liquid contents of the tank to be expeditiously transferred from it to either of the reservoirs or vice versa at will.

A crane L is arranged at the side of the tank and so geared and driven that, when continuously operated from the moment when an ingot carried by it is about to enter the liquid in the tank, the ingot is lowered to a predetermined depth and then raised, at such a rate that the immersion has sufficiently cooled the ingot to prevent its recalescing after emerging from the liquid.

Between each reservoir and the tank, and connected in the pipe line between the reservoir and tank is a cooling device M of any desired construction and a filter-press O is provided for each reservoir and so connected that the contents can be filtered as and when desired.

At the bottom of the tank are trestles P, as shown in Fig. 4, to receive the ingot R and to support it clear of the bottom of the tank by a distance of about 1 foot.

The loss by evaporation or wastage in a structure such as shown in Fig. 3 may be made up from any suitable source.

The liquid in the tank should not rise to a temperature above about 120° F. and when thus heated it should be pumped into the empty reservoir and cooled either on its way thither or when next returned from the reservoir back into the tank. When the tank has been thus emptied of the hot liquid, cool liquid is run in from the other reservoir, whereupon the tank is ready for the treatment of another cast.

What I claim as my invention and desire to secure by Letters Patent is:—

1. In apparatus for immersing hot steel ingots in a liquid bath, the combination of an immersing tank, means to lower an ingot into and raise it out of the tank, two reservoirs each of a capacity not less than the capacity of the tank, ducts connecting the interior of the tank with both reservoirs, and means to transfer the bath liquid from the tank to either reservoir.

2. In apparatus for immersing hot steel ingots in a liquid bath, the combination of an immersing tank, means to lower an ingot into and raise it out of the tank, two reservoirs located above the tank so that the liquid can gravitate from the reservoirs to the tank, and a pump whose suction is connected to the tank and whose delivery is connected with the first reservoir substantially as set forth.

3. In apparatus for immersing hot steel ingots in a liquid bath, the combination of an immersing tank, means to lower the ingot into the tank with its length approximately horizontal such that continuous operation of the said means successively lowers the ingot to full submersion and then raises it, two reservoirs, ducts connecting the interior of the tank with both reservoirs, and means to transfer the bath liquid from the tank to either reservoir.

4. In apparatus for immersing hot steel ingots in a liquid bath, the combination of an immersing tank, means to lower the ingot into and raise it out of the tank, two reservoirs, ducts connecting the interior of the tank with both reservoirs, means to cool the liquid in its passage from the tank to the reservoir, and means to transfer the bath liquid from the tank to either reservoir.

5. In apparatus for immersing hot steel ingots in a liquid bath, the combination of an immersing tank, means to lower the ingot into and raise it out of the tank, two reservoirs, ducts connecting the interior of the tank with both reservoirs, means to cool the liquid in its passage from the tank to the reservoir, means to filter the liquid, and means to empty the tank and transfer the liquid to either reservoir.

6. In apparatus for immersing hot steel ingots in a liquid bath, the combination of an immersing tank, means to lower the ingot into and raise it out of the tank, two reservoirs, ducts connecting the interior of the bath tank with both reservoirs, means to transfer the liquid from the tank to the reservoirs and a third tank connected to the system for supplying the loss of liquid.

In testimony whereof I have signed my name to this specification.

CHARLES DEAR.